US010482139B2

(12) United States Patent
Khaitan et al.

(10) Patent No.: US 10,482,139 B2
(45) Date of Patent: Nov. 19, 2019

(54) STRUCTURED USER GRAPH TO SUPPORT QUERYING AND PREDICTIONS

(71) Applicant: Google LLC, Mountain View, CA (US)

(72) Inventors: Pranav Khaitan, Mountain View, CA (US); Shobha Diwakar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 14/071,867

(22) Filed: Nov. 5, 2013

(65) Prior Publication Data

US 2015/0127632 A1 May 7, 2015

(51) Int. Cl.
*G06F 16/00* (2019.01)
*G06F 16/9535* (2019.01)

(52) U.S. Cl.
CPC .............................. *G06F 16/9535* (2019.01)

(58) Field of Classification Search
CPC . G06F 17/30554; G06F 16/9535; G06F 16/36
USPC .................................................. 707/722, 708
See application file for complete search history.

(56) References Cited

U.S. PATENT DOCUMENTS

| | | | |
|---|---|---|---|
| 7,930,302 B2* | 4/2011 | Bandaru et al. | 707/737 |
| 8,386,495 B1 | 2/2013 | Sandler et al. | |
| 2007/0276591 A1* | 11/2007 | Lea | G06F 17/30035 701/408 |
| 2008/0133488 A1 | 6/2008 | Bandaru et al. | |
| 2009/0035733 A1* | 2/2009 | Meitar et al. | 434/118 |
| 2009/0234832 A1* | 9/2009 | Gao | G06F 17/3064 |
| 2010/0318537 A1* | 12/2010 | Surendran et al. | 707/759 |
| 2011/0093479 A1 | 4/2011 | Fuchs | |
| 2012/0197911 A1* | 8/2012 | Banka | G06F 17/30864 707/752 |
| 2012/0271837 A1* | 10/2012 | Kryger et al. | 707/751 |
| 2013/0066921 A1* | 3/2013 | Mark et al. | 707/794 |

(Continued)

FOREIGN PATENT DOCUMENTS

CN 101772792 A 7/2010

OTHER PUBLICATIONS

International Search Report and Written Opinion in International Application No. PCT/US2014/060239, dated Jan. 21, 2015, 10 pages.

(Continued)

*Primary Examiner* — Tamara T Kyle
*Assistant Examiner* — Lahcen Ennaji
(74) *Attorney, Agent, or Firm* — Fish & Richardson P.C.

(57) ABSTRACT

Methods, systems, and apparatus, including computer programs encoded on a computer storage medium, for receiving user-specific content, the user-specific content being associated with a user of one or more computer-implemented services, processing the user-specific content using one or more parsers to identify one or more entities and one or more relationships between entities, a parser being specific to a schema, and the one or more entities and the one or more relationships between entities being identified based on the schema, providing one or more user-specific knowledge graphs, a user-specific knowledge graph being specific to the user and including nodes and edges between nodes to define relationships between entities based on the schema, and storing the one or more user-specific knowledge graphs.

27 Claims, 3 Drawing Sheets

(56) References Cited

U.S. PATENT DOCUMENTS

| | | | |
|---|---|---|---|
| 2013/0103300 A1* | 4/2013 | Rakthanmanon | G01C 21/3484 |
| | | | 701/408 |
| 2013/0144899 A1* | 6/2013 | Lee | G06F 17/30392 |
| | | | 707/759 |
| 2013/0218876 A1* | 8/2013 | Lonnfors | G06F 17/30672 |
| | | | 707/723 |
| 2014/0280089 A1* | 9/2014 | Moxley | G06F 17/3053 |
| | | | 707/723 |
| 2014/0280548 A1* | 9/2014 | Langlois | H04L 67/306 |
| | | | 709/204 |
| 2014/0282219 A1* | 9/2014 | Haddock | 715/781 |

OTHER PUBLICATIONS

International Preliminary Report on Patentability in International Application No. PCT/US2014/060239, dated May 19, 2016, 9 pages.

Extended European Search Report in European Application No. 14860695.7, dated Mar. 28, 2017, 7 pages.

CN Office Action issued in Chinese Application No. 201480060678.7, dated Nov. 29, 2018, 17 pages (with English translation).

EP Summons to Attend Oral Proceedings issued in European Application No. 14860695.7, mailed on Nov. 29, 2018, 8 pages.

CN Office Action in Chinese Application No. 201480060678.7, dated May 10, 2019, 18 pages (with English translation).

\* cited by examiner

STRUCTURED USER GRAPH TO SUPPORT QUERYING AND PREDICTIONS

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., click on, search results to acquire information of interest.

SUMMARY

This specification relates to supporting querying and predictions.

Implementations of the present disclosure are generally directed to user-specific structured graphs that can be used to support queries submitted by users and/or predictions relevant to users. More particularly, implementations of the present disclosure are directed to providing a user-specific structured graph that is specific to a particular user. Implementations of the present disclosure are further directed to using the user-specific structured graph to provide results in response to one or more queries submitted by the user, and/or to surface data that might be relevant to the user.

In general, innovative aspects of the subject matter described in this specification can be embodied in methods that include actions of receiving user-specific content, the user-specific content being associated with a user of one or more computer-implemented services, processing the user-specific content using one or more parsers to identify one or more entities and one or more relationships between entities, a parser being specific to a schema, and the one or more entities and the one or more relationships between entities being identified based on the schema, providing one or more user-specific knowledge graphs, a user-specific knowledge graph being specific to the user and including nodes and edges between nodes to define relationships between entities based on the schema, and storing the one or more user-specific knowledge graphs. Other implementations of this aspect include corresponding systems, apparatus, and computer programs, configured to perform the actions of the methods, encoded on computer storage devices.

These and other implementations can each optionally include one or more of the following features: providing one or more user-specific knowledge graphs includes determining that a node representing an entity of the one or more entities and an edge representing a relationship associated with the entity are absent from a user-specific knowledge graph, and adding the node and the edge to the user-specific knowledge graph, the edge connecting the node to another node of the user-specific knowledge graph; actions further include: receiving a query, receiving one or more user-specific results that are responsive to the query, the one or more user-specific results being provided based on the one or more user-specific knowledge graphs, and providing the one or more user-specific results for display to the user; an edge is associated with a weight, the weight indicating a relevance of a relationship represented by the edge; a value of the weight increases based on reinforcement of the relationship in subsequent user-specific content; a value of the weight decreases based on lack of reinforcement of the relationship in subsequent user-specific content; a plurality of user-specific knowledge graphs are provided based on the user-specific content, each user-specific knowledge graph being specific to a respective schema; and the user-specific content is provided through use of the one or more computer-implemented services by the user.

Particular implementations of the subject matter described in this specification can be implemented so as to realize one or more of the following advantages. Implementations of the present disclosure enable knowledge about individual users to be captured in a structured manner, enabling results to be provided in response to complex queries, e.g., series of queries, regarding a user. In some examples, the user-specific knowledge graph provides a single canonical representation of the user based on user activity inferred from one or more computer-implemented services. In some examples, user activities could be overlapping, where reconciliation of the user-specific knowledge graph ensures a canonical entry is provided for each activity. In some examples, implementations of the present disclosure joins/integrates utility of a universal knowledge graph, e.g., non-user-specific knowledge graph, and user-specific knowledge graphs.

Where user information may be collected or used by the systems discussed here, or the systems discussed here may make use of users information, users may be given an opportunity to control whether the user information, e.g., information about a user's social network, social actions or activities, profession, a user's preferences, or a user's current location, is collected, and to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized so that a particular location of a user cannot be determined.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
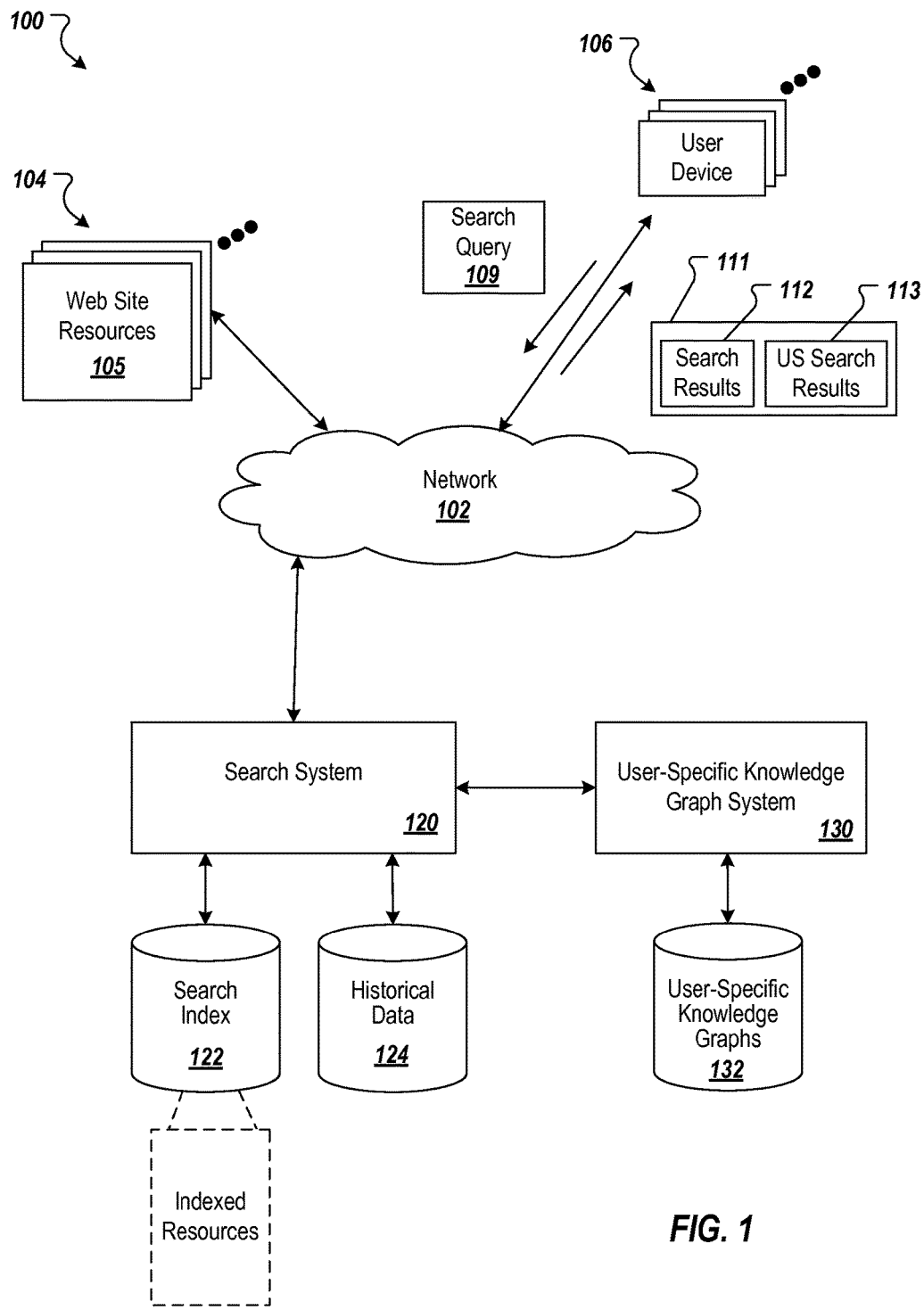
FIG. 1 depicts an example environment in which users can interact with one or more computer-implemented services.

FIG. 1 depicts an example environment 100 in which users can interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search service is depicted, which is discussed in further detail herein. It is appreciated, however, that implementations of the present disclosure can include one or more computer-implemented services, such as the examples discussed herein.

With continued reference to FIG. 1, a search system 120 provides search services. The example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 typically includes a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer). The selection data can also include, for each selection of a search result 112, data identifying the search query 109 for which the search result 112 was provided.

In accordance with implementations of the present disclosure, the example environment 100 also includes user-specific knowledge graph system 130 communicably coupled to the search system 120, e.g., directly coupled or coupled over a network such as network 102. In some examples, and in the case of multiple computer-implemented services, the user-specific knowledge graph system 130 is communicably coupled to respective systems that provide functionality of the respective computer-implemented services. In some examples, the systems, e.g., the search system 120, can interact with the user-specific knowledge graph system 130 to provide a user-specific knowledge graph, as discussed in further detail herein. In some examples, the user-specific knowledge graph system 130 provides one or more user-specific knowledge graphs, which can be stored in a data store 132. In some examples, each user-specific knowledge graph is specific to a user of the one or more computer-implemented services, e.g., search services provided by the search system 120.

In some examples, the search system 120 can interact with the user specific knowledge graph system 130 to provide one or more user-specific search results in view of the search query 109. In some examples, the user-specific knowledge graph system 130 can provide user-specific information based on a user-specific knowledge graph to the search system 120, which can use the user-specific information to provide user-specific search results 113. In some examples, the user-specific knowledge graph system 130 can provide a user-specific knowledge graph to the search system 120, which can use the user-specific knowledge graph to provide the user-specific search results 113.

Implementations of the present disclosure are generally directed to structured user graphs. More particularly, implementations of the present disclosure are directed to user-specific knowledge graphs, introduced above, which are specific to respective users. In some implementations, the user-specific knowledge graphs can be used to support querying and predictions. In some examples, the user-specific knowledge graph is provided based on content that is associated with the user. In some implementations, the user-specific knowledge graph includes a plurality of nodes and edges between nodes. In some examples, a node represents an entity and an edge represents a relationship between entities. Nodes and/or entities of a user-specific knowledge graph can be provided based on the content associated with a respective user, to which the user-specific knowledge graph is specific. In some examples, the user-specific knowledge graph can be provided based on one or more schemas. In some examples, a schema describes how data is structured in the user-specific knowledge graph.

Implementations of the present disclosure are discussed in further detail herein with reference to an example schema. It is appreciated, however, that implementations of the present disclosure can be realized using any appropriate schema, and/or multiple schemas. In general, a schema defines a structure for information provided in the graph. In this manner, a downstream system, e.g., a search system such as the search system 120, a prediction system, can engage the user-specific knowledge graph based on the schema.

The example schema structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic.

In some implementations, and as introduced above, the user-specific knowledge graph can be provided based on content associated with a respective user. In some implementations, the content is processed by one or more parsers to populate the user-specific structured graph. In some examples, each parser is specific to a particular schema. In some implementations, the content can be processed to provide one or more nodes and/or one or more edges between nodes. For example, the content can be processed to add one or more nodes to a user-specific structured graph. As another example, the content can be processed to add one or more edges between nodes that are already present in the user-specific structured graph.

In some implementations, and as discussed above, content associated with the user can be provided from one or more computer-implemented services. For example, the user can be a user of one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In some examples, the content can be provided based on the user's use of one or more of the computer-implemented services. For example, the user can send and/or receive electronic mail messages using the electronic mail messages. As another example, the user can receive and/or distribute posts using the social networking service.

In some implementations, an edge can be associated with a respective weight. In some examples, the weight indicates a relative strength in the relationship between nodes. In some examples, the weight can be determined based on the content associated with the user, which content underlies provision of the user-specific knowledge graph. For example, the content can provide a single instance of a relationship between nodes, or the content can provide multiple instances of a relationship between nodes. In some examples, an edge that is provided based on a single instance can have a weight that is less than the weight of an edge that is provided based on multiple instances. In some examples, the weight can be within a range that can be defined between and including a minimum value, e.g., 0, and a maximum value, e.g., 1.

In some examples, the weight can be dynamic, such that the weight can vary over time based on content associated with the user. In some examples, the weight can be provided based on content associated with the user at a first time. In some examples, the weight can vary based on content or a lack of content associated with the user at a second time. For example, the content at the first time can indicate a relationship between nodes. Consequently, an edge between the nodes can be provided and a respective weight can be provided at a first value. In one example, at the second time, it can be determined that further content associated with the user, e.g., content that was provided after the first time, indicates another instance of the relationship between the nodes. Consequently, the weight can be increased from the first value to a second value. In another example, at the second time, it can be determined that further content associated with the user, e.g., content that was provided after the first time, does not indicate other instances of the relationship between the nodes. Consequently, the weight can be decreased from the first value to a second value. In other words, the weight can decay over time, if the relationship is not reinforced through additional instances in content associated with the user. In some examples, the weight can decay to the minimum value, e.g., 0. In some examples, even if a weight decays to the minimum value, the edge still remains between the nodes. That is, although the relevance of a particular relationship represented by the edge may become less over time, the existence of the relationship is still a fact that remains over time.

In some implementations, a plurality of user-specific knowledge graphs can be provided for a particular user. In some examples, each user-specific knowledge graph is specific to a particular schema, e.g., the example schema discussed above. For example, content that is associated with the user can be processed to provide a first user-specific knowledge graph that is based on a first schema, and to provide a second user-specific knowledge graph that is based on a second schema. In other words, the multiple user-specific knowledge graphs based on respective schemas can be provided based on the same content.

In general, the user-specific knowledge graph represents knowledge about a specific user in a structured manner. That is, the user-specific knowledge graph represents at least a portion of the user's world through content associated with the user through one or more computer-implemented services. The knowledge captured in the user-specific knowledge graph can include various aspects of the user's world including, for example, activities, films, food, social connections, e.g., real-world and/or virtual, education, general likes, and general dislikes among many other aspects.

A user-specific knowledge graph can be distinguished from a user-specific social graph. In some examples, a user-specific social graph can represent social connections between the user and other users, or entities. In some examples, a social graph can refer to a single social graph or multiple interconnected social graphs. Distinct social graphs can be generated for different types of connections a user has. For example, a user can be connected with chat contacts in one social graph, electronic message contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections.

In some examples, the user-specific knowledge graph represents the user as a whole and can include aspects of the user's world in addition to social connections. With regard to social connections, the user-specific knowledge graph can provide further knowledge regarding the user and their social connections, e.g., activities done together, likes in common, dislikes in common, which knowledge is not captured in a social graph.

Figure 2:
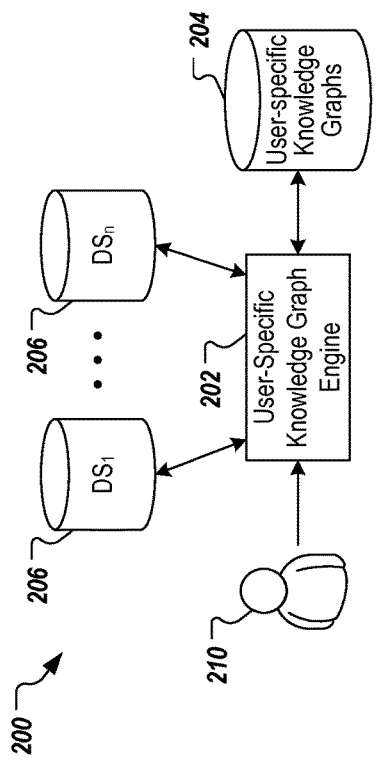
FIG. 2 depicts an example environment to provide user-specific knowledge graphs.

FIG. 2 depicts an example environment 200 to provide user-specific knowledge graphs. In the depicted example, the environment 200 includes a user-specific knowledge graph engine 202, a data store 204, e.g., the data store 132 of FIG. 1, and one or more data sources 206. As discussed in further detail herein, the user-specific knowledge graph engine 202 can receive content associated with particular users 210, which content can be provided from one or more of the one or more data sources 206. In some examples, the user-specific knowledge graph engine 202 can be provided in the user-specific knowledge graph system 130 of FIG. 1. In some examples, each data source 206 is specific to a particular computer-implemented service. For example, a data source 206 can be associated with a search service, e.g., provided by the search system 120 of FIG. 1. As another example, a data source can be associated with a computer-implemented social networking service.

In some implementations, and for a particular user 210, the user-specific knowledge graph engine 202 receives content from one or more of the data sources 206 based on an identifier associated with the user 210. For example, the user 210 can be associated with an identifier, which uniquely identifies the user 210 to each of the computer-implemented services. In some examples, the user-specific knowledge graph engine 202 receives content from the one or more data sources 206 based on the identifier. For example, content associated with the particular user 210 can be identified within a data source 206, and that content can be provided to the user-specific engine.

In some implementations, the user-specific knowledge graph engine 202 provides one or more parsers to provide respective user graphs for the particular user 210. In some examples, and as introduced above, each parser can be specific to a schema. In some examples, a parser processes content received form the one or more data sources 206 to identify entities and/or relationships between entities based on a respective schema. Nodes and/or edges of a user-specific knowledge graph can be provided based on identified entities and relationships between entities.

In some examples, it can be determined that a user-specific knowledge graph for the particular user and the particular schema is already available. Consequently, newly identified entities and/or relationships between entities can be used to revise the already existing user-specific schema, e.g., already stored in the data store 204. For example, it can be determined that multiple entities and a relationship between the multiple entities that have been identified from content associated with the user are already represented in the user-specific knowledge graph, e.g., as nodes and an edge. Consequently, a weight associated with the relationship can be increased, e.g., assuming that the weight is not already at a maximum value. As another example, multiple entities and a relationship between the multiple entities can be identified from content associated with the user, and it can be determined that an entity of the multiple entities is already represented in the user-specific knowledge graph, e.g., as an existing node. Consequently, a new node can be added to the user-specific knowledge graph to represent another entity of the multiple entities, and an edge between the new node and the existing node can be provided to represent the relationship between the multiple entities.

Figure 3:
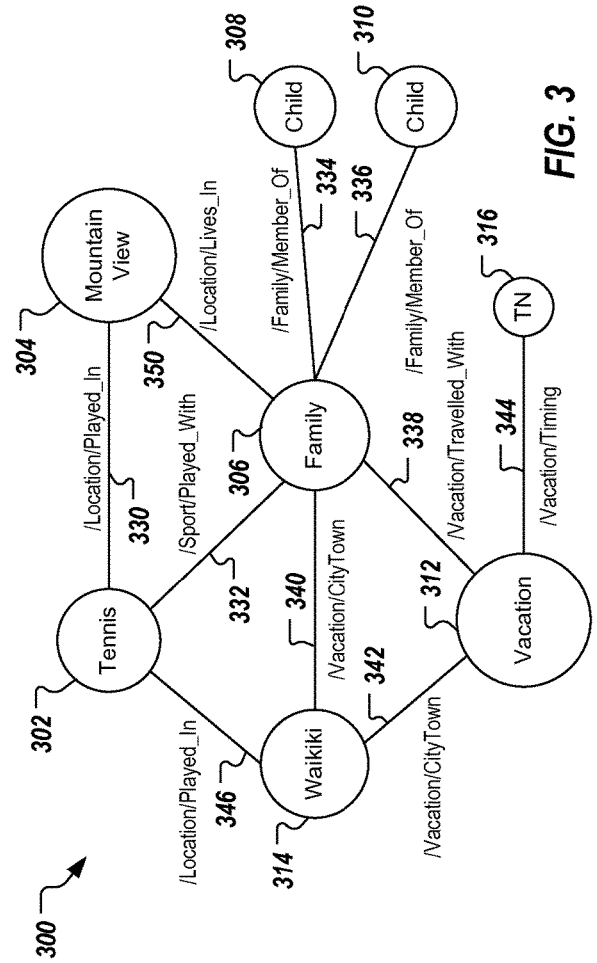
FIG. 3 depicts an example portion of an example user-specific knowledge graph.

Implementations of the present disclosure will be described in further detail with reference to example content associated with a fictitious user, and an example portion of an example user-graph. FIG. 3 depicts an example portion 300 of an example user-specific knowledge graph. More particularly, the example portion 300 of FIG. 3 can be provided based on the example content, as discussed in detail below.

The example content includes search queries submitted by the user to a search service, a post that the user posts to a social networking service, and electronic messages received by the user. For example, the user can submit the example search query [playing tennis with my kids in mountain view] to a search service. In response to the search query, search results can be provided to the user, which can provide information about playing tennis with kids in Mountain View, Calif. Also in response to the search query, and referring to FIG. 3, nodes 302, 304, 306, 308, 310 can be provided, where node 302 represents the entity "Tennis," the node 304 represents the entity "Mountain View," the node 306 represents the entity "Family," and the nodes 308, 310 represent respective entities "Child." Also in response to the search query, an edge 330 can be provided and represents a "/Location/Play_In" relationship between the nodes 302, 304, an edge 332 can be provided and represents a "/Sport/Played_With" relationship between the nodes 302, 306, and edges 334, 336 can be provided and represent respective "/Family/Member_Of" relationships between the node 306 and the nodes 308, 310. The edges are provided based on the particular schema, such as the example schema discussed above. In some examples, and although not depicted in FIG. 3, respective weights can be associated with each of the edges 330, 332, 334, 336. For example, each weight can be assigned a default value, e.g., 0.5.

The user can post the example post "We had a great time playing tennis with our kids today!" to a computer-implemented social networking service, and the post can be associated with geo-location data indicating Mountain View, Calif. In response to the post, it can be determined that nodes representing tennis, Mountain View, family and children, as well as respective edges between the nodes are already provided. Consequently, new nodes and/or edges are not added to the example portion 300. However, the example post reinforces the relevance of the various entities and the relationships between the entities to the particular user. Consequently, the respective weights associated with the edges 330, 332, 334, 336 can be incremented, e.g., from 0.5 to 0.6.

The user can receive an electronic message from a hotel, which electronic message can include "Confirming your hotel reservation in Waikiki, Hi. from Oct. 15, 2014 through Oct. 20, 2014. We're looking forward to making your family's vacation enjoyable!" In response to the electronic message, nodes 312, 314 can be provided, where the node 312 represents the entity "Vacation" and the node 314 represents the entity "Waikiki" Also in response to the electronic message, an edge 338 can be provided and represents a "/Vacation/Travelled_With" relationship between the nodes 306, 312, an edge 340 can be provided and represents a "/Vacation/CityTown" relationship between the nodes 306, 314, and an edge 342 can be provided and represents a "/Vacation/CityTown" relationship between the nodes 312, 314. The edges are provided based on the particular schema, such as the example schema discussed above.

In some implementations, one or more timing nodes can be associated with other nodes. For example, and in response to the example electronic message, a timing node 316 can be provided, which timing node can represent October 2014, or a date range of Oct. 15, 2014 through Oct. 20, 2014. An edge 344 can be provided and represents a "/Vacation/Timing" relationship between the nodes 312, 316. In some examples, and although not depicted in FIG. 3, respective weights can be associated with each of the edges 338, 340, 342, 344. For example, each weight can be assigned a default value, e.g., 0.5.

The user can submit the example search query [kids tennis lessons in waikiki] to a search service. In response to the search query, it can be determined that that nodes representing tennis, Waikiki, family and children, as well as respective edges between at least some of the nodes are already provided. Consequently, new nodes and/or edges are not added to the example portion 300. However, the example search query reinforces the relevance of the various entities and the relationships between the entities to the particular user. Consequently, the respective weights associated with the edges can be incremented. However, it can be determined that the example search query provides a relationship between the tennis entity and the Waikiki entity. Consequently, an edge 346 can be added and represents a relationship "/Location/Played_In" between the nodes 302, 314.

The user can receive an electronic message from a tennis club, which electronic message can include "Confirming tennis lessons at The Club of Tennis, Waikiki, Hi." In response to the electronic message, it can be determined that that nodes representing tennis, and Waikiki, for example, as well as a respective edge between the nodes are already provided. Consequently, new nodes and/or edges are not added to the example portion 300. However, the example electronic message reinforces the relevance of the various entities and the relationships between the entities to the particular user. Consequently, a respective weight associated with the edge 346, for example, can be incremented. Although not depicted in the example of FIG. 3, a node could be added to represent the entity "The Club of Tennis," which node could be connected to one or more other nodes, e.g., the nodes 302, 314 with respective edges.

In the depicted example, an edge 350 is provided between the nodes 304, 306, and represents a relationship "/Location/Lives_In." In some examples, the edge 350 can be provided based on content associated with the user in one or more of the one or more computer-implemented service. For example, the user can establish a profile within one or more of the computer-implemented services, which profile can indicate that the user lives in Mountain View, Calif.

Figure 4:
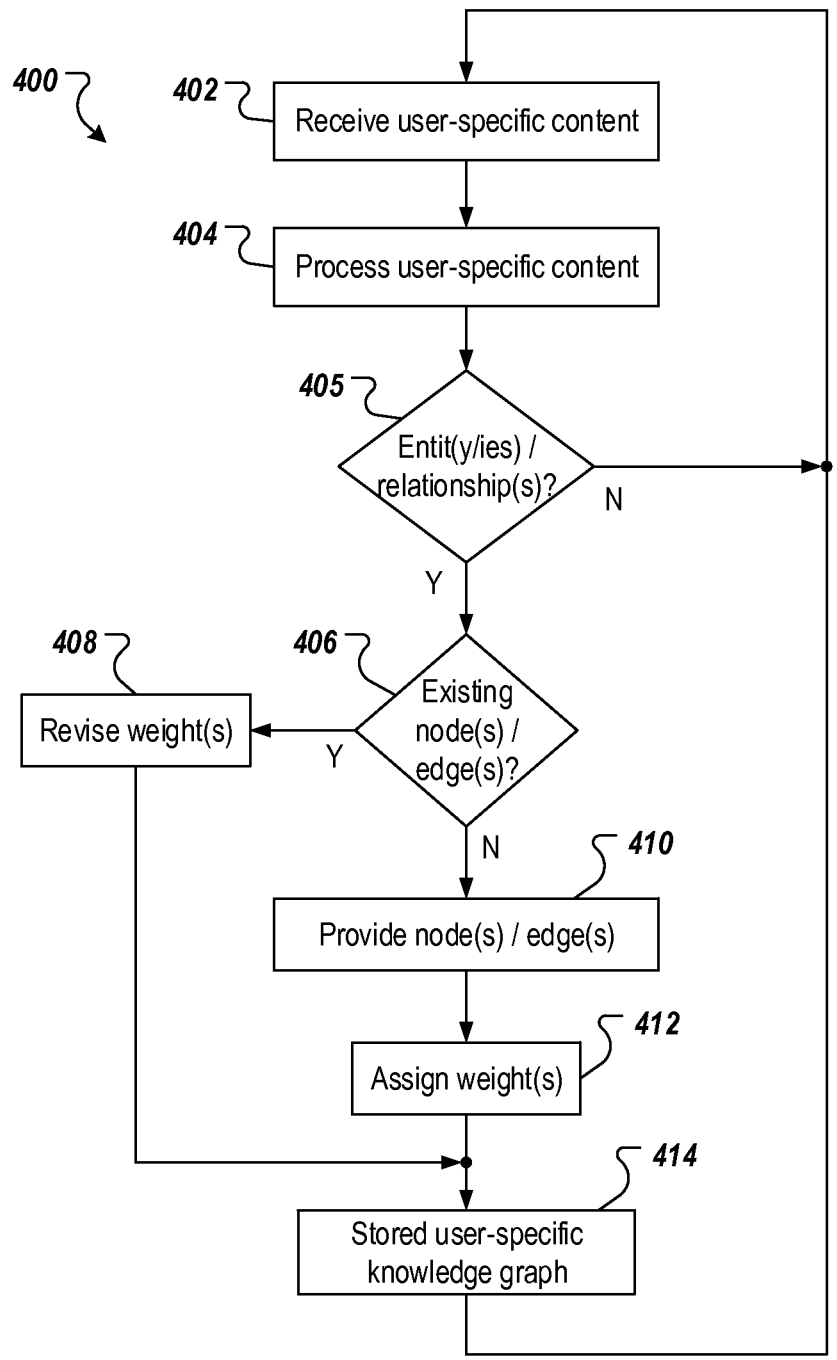
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the user-specific knowledge graph system 130 of FIG. 1. In some examples, the example process 400 can be provided by one or more computer-executable programs executed using one or more computing devices. In some implementations, the example process 400 is performed to provide one or more user-specific knowledge graphs.

User-specific content is received (402). For example, user-specific content associated with a particular user, for which a user-specific knowledge graph is to be provided, can be received by the user-specific knowledge graph system 130. In some examples, the user-specific content is provided from one or more data sources, each data source being associated with a computer-implemented service. The user-specific content is processed (404). For example, the user-specific knowledge graph system 130 can process the user-specific content using one or more parsers to identify one or more entities and/or one or more relationships. In some examples, each parser of the one or more parsers is specific to a schema.

It is determined whether one or more entities and/or one or more relationships have been identified from the user-specific content (404). For example, the user-specific knowledge graph system 130 can determine whether one or more entities and/or one or more relationships have been identified from the user-specific content based on the processing (405). If it is determined that one or more entities and/or one or more relationships have not been identified, the example process 400 loops back to receive further user-specific content, or to wait for further user-specific content.

If it is determined that one or more entities and/or one or more relationships have been identified, it is determined whether existing one or more nodes and/or existing one or more edges that respectively represent the identified one or more entities and/or one or more relationships are provided (406). For example, the user-specific knowledge graph system 130 can determine that a user-specific knowledge graph does not yet exist for the particular user and, consequently, existing one or more nodes and/or existing one or more edges that respectively represent the identified one or more entities and/or one or more relationships are not provided. As another example, the user-specific knowledge graph system 130 can determine that, although, a user-specific knowledge graph does exist for the particular user, existing one or more nodes and/or existing one or more edges that respectively represent at least some of the identified one or more entities and/or one or more relationships are not provided. If it is determined that existing one or more nodes and/or existing one or more edges that respectively represent the identified one or more entities and/or one or more relationships are provided, one or more weights respectively associated with one or more edges can be revised (408). In some examples, a weight can be incremented in response to reinforcement of an existing edge between existing nodes through the user-specific content.

If it is determined that existing one or more nodes and/or existing one or more edges that respectively represent the at least some of the identified one or more entities and/or one or more relationships are not provided, respective one or more nodes and/or one or more edges are provided (410). For example, the user-specific content system 130 can add one or more edges and/or one or more nodes to an existing user-specific knowledge graph to represent one or more entities and/or one or more relationships that were identified from the 25 user-specific content, but were not represented in the existing user-specific knowledge graph. One or more weights are assigned (412). For example, the user-specific knowledge graph system can assign weights to newly added one or more edges. In some examples, a default weight can be assigned. The user-specific knowledge graph is stored (414). For example, the newly provided or updated user-specific knowledge graph is stored in the data store 132.

In some implementations, and as discussed above, multiple user-specific knowledge graphs can be provided, each user-specific knowledge graph being specific to a respective schema. In some implementations, the multiple user-specific knowledge graphs can be provided in a compound user-specific knowledge graph. In some examples, the compound user-specific knowledge graph provides a single representation of multiple user-specific knowledge graphs. For example, a first user-specific knowledge graph can include a node representing a first entity, a node representing a second entity and an edge between the nodes representing a relationship between the entities. The edge can be provided based on a first schema that the first user-specific knowledge graph is specific to. A second user-specific knowledge graph can include a node representing the first entity, a node representing the second entity and an edge between the nodes representing the relationship between the entities. The edge can be provided based on a second schema that the first user-specific knowledge graph is specific to, the second schema being different from the first schema. A compound user-specific knowledge graph can be provided to represent the first user-specific knowledge graph and the second user-specific knowledge graph. For example, the compound user-specific knowledge graph can include a node representing the first entity, a node representing the second entity, a first edge between the nodes representing the relationship between the entities based on the first schema, and a second edge between the nodes representing the relationship between the entities based on the second schema. Accordingly, the compound user-specific knowledge graph can include multiple edges between nodes, each edge being based on a respective schema.

Implementations of the present disclosure are further directed to using the user-specific knowledge graph to provide results in response to one or more queries submitted by a user, and/or to surface data that might be relevant to the user. In the context of queries submitted by the user, the user can submit a search query to a search system, e.g., the search system 120 of FIG. 1, and the search system can provide search results that are responsive to the search query. In some examples, search results can include user-specific search results, e.g., the user-specific search results of FIG. 1, which are provided based on a user-specific knowledge graph that is specific to the user.

For example, a user-specific knowledge graph can include the example portion 300 of FIG. 3. The user associated with the user-specific knowledge graph can submit the example query [what should I do with the kids]. In some examples, one or more sub-queries can be determined from the query, and can be used to query the user-specific knowledge graph. In this example, example sub-queries can include [common activities] and [activities with kids]. Based on the example portion 300 of FIG. 3, tennis can be one of one or more activities that are returned in response to the sub-query [common activities]. Other example activities that could be returned in response to the sub-query [common activities] can include "horror movies" and "happy hour" to provide an example set that includes tennis, horror movies and happy hour. Based on the example portion 300 of FIG. 3, tennis can be one of one or more activities that are returned in response to the sub-query [activities with kids]. Other example activities that could be returned in response to the sub-query [activities with kids] can include "playground" and "zoo" to provide an example set that includes tennis, playground and zoo. In this example, tennis is provided in both sets of responsive activities. Consequently, tennis can be provided as a user-specific search result in response to the query [what should I do with my kids].

In the context of predictions that can be provided to the user, the user-specific knowledge graph can be used to predict, for example, one or more activities that the user is likely to participate in, and/or one or more locations where the user is likely to travel. For example, for a coming weekend, a prediction system can automatically, e.g., absent a user request/query, query the user-specific knowledge graph with one or more queries, or a series of queries. An example series of queries can include [what are the user's most common weekend activities], [which of these weekend activities are usually undertaken with kids], and [how likely is it for the user to spend this weekend with his kids]. In some examples, results of the queries can be joined to provide a prediction, which prediction can be displayed to the user, e.g., activities/places the user will likely be interested in for the coming weekend.

In some implementations, user-specific querying and/or predictions can be provided to the user based on weights of the user-specific knowledge graph. Using querying as an example, a set of user-specific search results can be provided based on the user-specific knowledge graph. In some examples, user-specific search results can be included in the set based on respective weights. For example, if the weight of an edge relating the activity to the user exceeds a threshold weight, the activity is included in the set. As another example, if the weight of an edge relating the activity to the user does not exceed a threshold weight, the activity is not included in the set. In this manner, less common activities, e.g., activities that may be of less interest to the user are not returned as user-specific search results. In some implementations, user-specific search results in the set of user-specific search results can be provided to the user in rank order based on weights. In this manner, user-specific search results that may be of more interest to the user can be displayed more prominently.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for providing an answer for a query specific to a user, the method comprising:
   receiving, by a system of one or more computers, a query specific to a specific user, wherein the query specific to the user includes one or more terms that represent an entity, an entity type, or an entity attribute;
   identifying, by the system, a user-specific knowledge graph generated from user-specific content representing past real-world physical activities of the specific user and date ranges representing when the real-world physical activities occurred, captured in one or more computer-implemented services and occurring outside the computer-implemented services, the user-specific knowledge graph comprising nodes that represent entities in the user-specific content, wherein the nodes include at least one timing node that represents a date range, and edges connecting pairs of nodes that each represent a respective relationship, identified from the user-specific content between the entities represented by the respective pairs of nodes,
   wherein an edge between: (i) a timing node and (ii) an activity node representing a real-world physical activity referenced in the user-specific content, indicates that the real-world physical activity occurred during the date range represented by the timing node;
   querying, by the system, the user-specific knowledge graph to find nodes that represent entities that match the entity, entity type, or entity attribute of the one or more terms of the query;
   determining, by the system, weights of edges connected to the found nodes in the graph, wherein the weight of each edge between a respective timing node and a respective activity node is based on how many times the real-world activity represented by the activity node is referenced in the user-specific content as occurring during the date range represented by the timing node; and
   providing, by the system, an answer for the query specific to the user based on the determined weights of the edges connected to the found nodes in the graph.

2. The method of claim 1, further comprising:
   providing, by the system, information from the found nodes that match an entity, entity type, or entity attribute of one or more terms of the query for display to the user.

3. The method of claim 1, further comprising:
   increasing a value of the weight of an edge based on reinforcement in the user-specific content of the relationship represented by the edge.

4. The method of claim 1, further comprising:
   decreasing a value of the weight of an edge based on lack of reinforcement in the user-specific content of the relationship represented by the edge.

5. The computer-implemented method of claim 1, wherein the query specific to the user includes a specific time, activity, or location.

6. The computer-implemented method of claim 1, wherein the query specific to the user is a query to predict participation of the specific user in one or more activities.

7. The computer-implemented method of claim 1, wherein the query specific to the user is a query to predict travel of the specific user to one or more locations.

8. The computer-implemented method of claim 1, wherein providing an answer for the query specific to the user further comprises:
   for each edge between found nodes, determining whether the weight of the edge connected to the found nodes exceeds a threshold weight;
   for each edge with a weight that exceeds the threshold weight, including, in the answer, entities represented by the other nodes connected to the found nodes by the edge; and
   for each edge with a weight that does not exceed the threshold weight, excluding, from the answer, entities represented by the other nodes connected to the found nodes by the edge.

9. The computer-implemented method of claim 1, wherein entities in the user-specific content are people, places, or things in addition to timings.

10. A system comprising:
    one or more computers and one or more storage devices on which are stored instructions that are operable, when executed by the one or more computers, to cause the one or more computers to perform operations comprising:

receiving a query specific to a specific user, wherein the query specific to the user includes one or more terms that represent an entity, an entity type, or an entity attribute;

identifying a user-specific knowledge graph generated from user-specific content representing past real-world physical activities of the specific user and date ranges representing when the real-world physical activities occurred, captured in one or more computer-implemented services and occurring outside the computer-implemented services, the user-specific knowledge graph comprising nodes that represent entities in the user-specific content, wherein the nodes include at least one timing node that represents a date range, and edges connecting pairs of nodes that each represent a respective relationship, identified from the user-specific content between the entities represented by the respective pairs of nodes, wherein an edge between: (i) a timing node and (ii) an activity node representing a real-world activity referenced in the user-specific content, indicates that the real-world physical activity occurred during the date range represented by the timing node;

querying the user-specific knowledge graph to find nodes that represent entities that match the entity, entity type, or entity attribute of the one or more terms of the query;

determining weights of edges connected to the found nodes in the graph, wherein the weight of each edge between a respective timing node and a respective activity node is based on how many times the real-world activity represented by the activity node is referenced in the user-specific content as occurring during the date range represented by the timing node; and providing an answer for the query specific to the user based on the determined weights of the edges between the found nodes in the graph.

11. The system of claim 10, wherein the operations further comprise:

providing information from the found nodes that match an entity, entity type, or entity attribute of one or more terms of the query for display to the user.

12. The system of claim 10, wherein the operations further comprise:

increasing a value of the weight of an edge based on reinforcement in the user-specific content of the relationship represented by the edge.

13. The system of claim 10, wherein the operations further comprise:

decreasing a value of the weight of an edge based on lack of reinforcement in the user-specific content of the relationship represented by the edge.

14. The system of claim 10, wherein the query specific to the user is a query to predict participation of the specific user in one or more activities.

15. The system of claim 10, wherein the query specific to the user is a query to predict travel of the specific user to one or more locations.

16. The system of claim 10, wherein providing an answer for the query specific to the user further comprises:

for each edge between found nodes, determining whether the weight of the edge connected to the found nodes exceeds a threshold weight;

for each edge with a weight that exceed the threshold weight, including, in the answer, entities represented by the other nodes connected to the found nodes by the edge; and for each edge with a weight that does not exceed the threshold weight, excluding, from the answer, entities represented by the other nodes connected to the found nodes by the edge.

17. The system of claim 10, wherein entities in the user-specific content are people, places, or things, in addition to timings.

18. A non-transitory computer readable medium storing instructions that, when executed by one or more computers, cause the one or more computers to perform operations comprising:

receiving a query specific to a specific user, wherein the query specific to the user includes one or more terms that represent an entity, an entity type, or an entity attribute;

identifying a user-specific knowledge graph generated from user-specific content representing past real-world physical activities of the specific user and date ranges representing when the real-world physical activities occurred, captured in one or more computer-implemented services and occurring outside the computer-implemented services, the user-specific knowledge graph comprising nodes that represent entities in the user-specific content, wherein the nodes include at least one timing node that represents a date range, and edges connecting pairs of nodes that each represent a respective relationship, identified from the user-specific content, between the entities represented by the respective pairs of nodes, wherein an edge between: (i) a timing node and (ii) an activity node representing a real-world physical activity referenced in the user-specific content, indicates that the real-world physical activity occurred during the date range represented by the timing node;

querying the user-specific knowledge graph to find nodes that represent entities that match the entity, entity type, or entity attribute of the one or more terms of the query determining weights of edges connected to the found nodes in the graph, wherein the weight of each edge between a respective timing node and a respective activity node is based on how many times the real-world activity represented by the activity node is referenced in the user-specific content as occurring during the date range represented by the timing node; and providing an answer for the query specific to the user based on the determined weights of the edges between the found nodes in the graph.

19. The non-transitory computer readable medium of claim 18, wherein the operations further comprise:

providing information from the found nodes that match an entity, entity type, or entity attribute of one or more terms of the query for display to the user.

20. The non-transitory computer readable medium of claim 18, wherein the operations further comprise:

increasing a value of the weight of an edge based on reinforcement in the user-specific content of the relationship represented by the edge.

21. The non-transitory computer readable medium of claim 18, wherein the operations further comprise:

decreasing a value of the weight of an edge based on lack of reinforcement in the user-specific content of the relationship represented by the edge.

22. The non-transitory computer readable medium of claim 18, wherein the query specific to the user includes a specific time, activity, or location.

23. The non-transitory computer readable medium of claim 18, wherein the query specific to the user is a query to predict participation of the specific user in one or more activities.

24. The non-transitory computer readable medium of claim 18, wherein the query specific to the user is a query to predict travel of the specific user to one or more locations.

25. The non-transitory computer-readable medium of claim 18, wherein providing an answer for the query specific to the user further comprises:
   for each edge connecting found nodes, determining whether the weight of the edge connected to the found nodes exceeds a threshold weight;
   for each edge with a weight that exceeds the threshold weight, including, in the answer, entities represented by the other nodes connected to the found nodes by the edge; and
   for each edge with a weight that does not exceed the threshold weight, excluding, from the answer, the entities represented by the other nodes connected to the found nodes by the edge.

26. The non-transitory computer-readable medium of claim 18, wherein entities in the user-specific content are people, places, or things, in addition to timings.

27. The system of claim 10, wherein the query specific to the user is a specific time, activity, or location.

* * * * *